April 10, 1956 CHAO C. WANG 2,741,718
HIGH FREQUENCY APPARATUS
Filed Sept. 26, 1950 5 Sheets-Sheet 1

INVENTOR
CHAO C. WANG

April 10, 1956  CHAO C. WANG  2,741,718
HIGH FREQUENCY APPARATUS
Filed Sept. 26, 1950  5 Sheets-Sheet 2

INVENTOR
CHAO C. WANG
BY
Paul B. Hunter
ATTORNEY

April 10, 1956  CHAO C. WANG  2,741,718
HIGH FREQUENCY APPARATUS
Filed Sept. 26, 1950  5 Sheets-Sheet 5

INVENTOR
CHAO C. WANG
BY
Paul B. Hunter
ATTORNEY

United States Patent Office 2,741,718
Patented Apr. 10, 1956

2,741,718

HIGH FREQUENCY APPARATUS

Chao C. Wang, Bayside, N. Y., assignor to Sperry Rand Corporation, a corporation of Delaware Application September 26, 1950, Serial No. 186,730

9 Claims. (Cl. 315—3.5)

This invention relates to electron beam forming apparatus for electron discharge devices and, more particularly to the use of magnetic beam forming means.

For certain types of electron tubes, it is desirable to maintain an electron beam with a small diameter for a considerable length. It is not very difficult to accomplish this result if the electron beam density involved is not large, such as in the case of a cathode ray tube or electron microscope, in which the repulsion forces between electrons are negligible. The electron optics employed in such electron discharge devices are based on a consideration of the trajectories of individual electrons without taking into account the presence of other electrons. Usually, in such devices electrostatic means of control are sufficient to confine the electron beam to a desired path.

In certain electron discharge devices, such as high-power klystrons or traveling-wave tubes, the electron beam current required is relatively large. At the same time, the beam should preferably be maintained small in cross-sectional area to obtain satisfactory beam-field interaction over a considerable length to yield high efficiency and gain. With such beams confined within a unipotential cylinder or conductor, no electrostatic field may be used to counteract the space charge repulsion forces. It is necessary in such cases that some additional forces be provided in order to accomplish the above objectives in electron beam requirements.

In view of the fact that an electron beam has a tendency to follow magnetic lines of force, it is possible to obtain a relatively long beam of small diameter by immersing the beam along the magnetic lines of force of a longitudinal magnetic field all the way to the cathode region where the beam originates. When the space charge repulsion force causes an electron to cross the magnetic flux, the resultant action of the magnetic field is in such a direction as to return the electron to the same magnetic line of force which it originally followed. The stronger the magnetic field is, the less distance the electron deviates; thus by increasing the magnetic field strength, it is possible to make the deviation or undulations extremely small.

However, where very high current density is desired, it may develop that from a practical standpoint an excessively large magnetic field would be required to minimize the undulations. Generally, this method of employing a strong magnetic field usually takes the form of completely immersing the cathode in such magnetic field.

The relationship of the electron beam trajectories under the influence of axially symmetrical magnetic and electrical fields has been presented by the present applicant in a paper entitled "Electron beams in axially symmetrical electric and magnetic fields," Proceedings of the I. R. E., volume 38, No. 2, February, 1950. The combined effects of the magnetic and electric fields may be expressed as a single generalized potential function which depends only on the axial and radial space coordinates. By such an analysis it is possible to state the axial and radial force components in terms of the axial and radial components of the gradient of this potential function.

By employing a uniform axially-directed magnetic field it is possible to obtain an electron beam of uniform cross-section, that is, completely eliminate the undulations so long as the magnetic field exists. Under such circumstances it is frequently desirable for reasons of economy to eliminate the magnetic field from the cathode region. This necessitates the introduction of the electron beam into the magnetic field in a control region inasmuch as the magnetic field will necessarily have a varying field strength at its beginning and end. In the control region the magnetic lines of force extend other than parallel to the electron beam axis; thus, the electrons must necessarily cross lines of flux prior to the time that they travel in paths extending parallel to the direction of the magnetic field. One such type of arrangement has been described in application S. N. 117,187, entitled High-Frequency Beam Tube Device, in the names of Charles E. Rich and Chao C. Wang, filed September 22, 1949, and assigned to the same assignee as the present application, now Patent No. 2,687,490, issued August 24, 1954.

At this point, it is convenient to discuss in general terms, the electron equilibrium path, which is the curve of the succession of points at which the space charge repulsion forces of the electron beam are balanced by an external magnetic field. Each point on the curve is displaced from the beam axis by a distance determined by the equilibrium radius in a plane perpendicular to the beam axis containing the point. The equilibrium radius at any such plane is a function of the accelerating voltage, the perveance of the electron beam and the magnetic field employed to control the electron beam. It is frequently difficult to obtain a substantially constant magnetic field extending along the length of an electron beam owing to the fact that in certain applications it is necessary to employ means defining an electromagnetic structure, such as a cavity resonator, together with suitable coupling elements.

Generally speaking, and according to one form of the present invention, an electron beam is introduced at an angle with respect to the equilibrium path, thereby giving rise to perturbations or undulations in the trajectories of the electrons. By properly controlling the aforementioned perturbations the strength of the required magnetic field for an accurately confined beam is relatively small. In addition, the electrons of the beam do not undergo cross-over. By increasing the magnetic field on the average to which the electron beam is subjected during its transit, the trajectories of the electrons may be controlled. Such an arrangement permits the interruption of magnetic focusing means at various points along the length of the beam. In addition, in view of the fact that different portions of the electron beam may have different densities giving rise to different equilibrium paths, it is possible to control the trajectories of the electrons of these different portions. An increasing magnetic field may be useful for balancing or counteracting the increasing radial or transverse debunching forces space charge repulsion which accompanies the formation of electron bunches with density modulation. Moreover, when employing the present invention in a velocity modulation device, such as a klystron, by employing magnetic lines of force in the regions of the resonator gaps which extend other than parallel to the axis of the device, difficulties arising from multipactor effect are minimized.

While, according to the present invention, it is possible to employ varying amounts of magnetic field extending into the cathode region, an arrangement is provided which yields an electron beam having an excellent trajectory with the magnetic field substantially completely excluded from the cathode region. Such an arrangement has the advantage of simplifying the structure and reducing the strength of the required magnetic field.

In order to suitably shape the electron beam prior to its entrance into the magnetic field, electrostatic focusing means may be employed. For instance, focusing means may be used such as are disclosed in application S. N. 81,480, entitled High Frequency Apparatus, in the name of the present applicant and filed March 15, 1949, which is now Patent 2,564,743, issued August 21, 1951. By accurately controlling the angle at which the electron beam crosses the curve of the equilibrium path, the configurations of the perturbations produced in the electron beam may be controlled.

For certain types of electron discharge devices, including those having a slow wave propagating structure for interaction with an electron beam, commonly known as traveling wave tubes, novel types of field means are provided in order to achieve the desired control of the trajectories of the electrons of a beam.

Accordingly, it is an object of the present invention to provide in connection with an electron beam an improved arrangement for controlling the trajectories of the electrons of the beam.

It is a further object of the present invention to provide magnetic focusing structure for accurately controlling a high density electron beam with a relatively small magnetic field.

Another object lies in the provision of an economical focusing arrangement for an electron beam which, in certain applications, envisions the exclusion of the magnetic field from the cathode region.

A still further object is to provide for the deliberate production of perturbations in an electron beam.

Another object is to provide controlled and satisfactory electron beam trajectories without the necessity for maintaining a constant magnetic field along the length of the beam.

A still further object lies in the provision of a device for obtaining improved beam trajectories employing a tapered magnetic field without introducing cross-over of the individual electrons constituting the beam.

A further object is to provide an improved electrostatic focusing arrangement in cooperation with a tapered magnetic field for providing improved electron trajectories.

A still further object lies in the provision of means for removing spurious electrons from the beam.

Another object is to provide in a slow wave propagating structure an improved field means for controlling the electron beam.

Other objects and advantages will become apparent from the specification, taken in connection with the accompanying drawings, wherein the invention is embodied in concrete form.

Similar characters of reference are used in all of the above figures to indicate corresponding parts.

Figure 1:
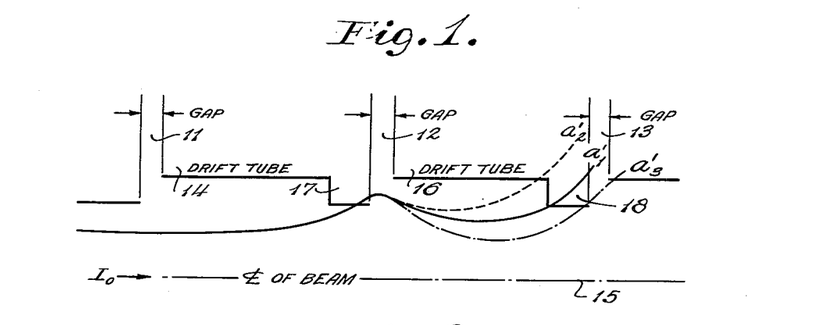
Figs. 1 and 2 are diagrammatical representations useful for explaining part of the principles of operation of the present invention.
Figure 2:
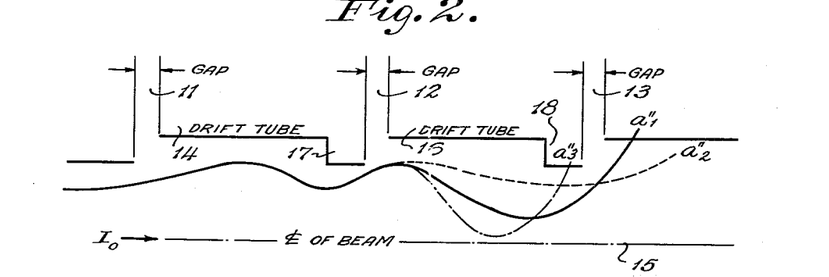

Referring to Figs. 1 and 2, there is shown a schematic representation of a velocity modulation device, such as a klystron, which is useful for illustrating part of the principles of the present invention. However, it will be understood that the invention is not limited to such a device. In connection with these figures it is contemplated that an electron beam will move from left to right in successive energy exchanging relationship with the three gaps, 11, 12, 13, which are assumed connected to cavity resonators (not shown). Drift tubes 14, 16, are arranged between the gaps 11, 12, 13, and have portions 17, 18, respectively, extending toward the axis 15 of the electron beam to suggest a staggering of the diameters of the walls of the drift tubes 14, 16, which define the gaps 11—13. It will, of course, be understood that the schematic showing of Figs. 1 and 2 is intended to represent drift tubes 14, 16 with their associated gaps 11—13, as coaxially arranged relative to the axis 15 of the electron beam. In view of the fact that the equilibrium paths and trajectories of the electrons of the beam are symmetrical with respect to the axis 15, it is unnecessary to illustrate the remainder of the structure.

It is also contemplated that the electron beam throughout its transit from gap 11 to gap 13 is subjected to a magnetic field having a variable flux density. In view of the fact that the electron beam undergoes density modulation, the electron density of various portions of the electron beam varies as it approaches gap 13. It is contemplated, as will be discussed more fully below in connection with Fig. 5, that the electron beam is subjected to cascade bunching, so that the major portion of the grouping of the electrons occurs between gap 12 and gap 13, that is, in drift tube 16.

The equilibrium radius at any point along the axis, such as axis 15, of an electron beam is that distance at which the force provided by a magnetic field balances the force arising from the mutual repulsion of electrons. The equilibrium radius, for a condition of the exclusion of the magnetic field from the cathode region, may be defined as equal to $$\frac{\sqrt{\overline{K}V_b}}{3.06 B_z} \text{ inches} \quad (1)$$

where $\overline{K}$ is the effective perveance in the microamperes per volts $^{3/2}$, $V_b$ is the accelerating voltage in volts, and $B_z$ is the magnetic field in gauss. Thus, by employing the above relationship (1), it is possible to determine the curves of the equilibrium paths for the beam electrons, such as curves $a'_1$, $a'_2$, and $a'_3$. Curve $a'_1$ is indicative of the equilibrium path for the portions of the electron beam in a density modulated device having average electron density, curve $a'_2$ is indicative of the equilibrium path for the bunched portions of the electron beam in said device, and curve $a'_3$ is indicative of the equilibrium path for the anti-bunch portions of the electron beam.

In the event that it is desired to take into account the presence of ions, which may tend to neutralize the space charge repulsion forces, the term $\overline{K}$, which is the effective perveance, may be varied accordingly. In other words, the effect of ion neutralization may be considered as reducing the current distribution of the beam.

Under the velocity modulation process, followed by density modulation, the density of the electron beam or perveance along the axis of a drift tube, such as for example drift tube 16, varies. This relationship is schematically and graphically illustrated in Fig. 3, wherein $a_2$ represents the center of an electron bunch, $a_3$ represents the anti-bunch and $a_1$ represents that portion of the electron beam having average electron density, that is, having that density which the electron beam possessed prior to subjection to the velocity modulation process, such as at the entrance to gap 11. The current distribution of the beam in drift tube 16 is shown by curve 19, with an average current line 21. Thus, while the magnetic field strength at successive points along the axis of the electron beam in the vicinity of the drift tube 16 may have fixed values of different magnitude, the perveance of the electron beam also varies. Since the major portion of the grouping of the electrons occurs between gap 12 and gap 13 in Fig. 1, as was mentioned above, the curves $a'_1$, $a'_2$, and $a'_3$ begin to branch in the vicinity of gap 12 and follow separate paths, thereby indicating the different equilibrium paths for such different portions of the electron beam. In Fig. 2 the curves $a''_1$, $a''_2$ and $a''_3$ of the trajectories of the portions $a_1$, $a_2$, and $a_3$, respectively of the electron beam are plotted. These are derived from the curves $a'_1$, $a'_2$, $a'_3$ shown in Fig. 1.

When an electron of the outer edge of the beam is at a radius greater than the equilibrium radius, the net force due to the magnetic field exceeds the force due to space charge repulsion so that the electron is accelerated toward the equilibrium path and the axis 15. In view of the fact that it possesses sufficient energy, it will cross the equilibrium path, such as curve $a'_1$, and then the combined force of the magnetic field and space charge repulsion arrests its motion toward axis 15 and returns it in the direction of the equilibrium path, such as curve $a'_1$, and the drift tube wall 14. It will, of course, be understood that simultaneously such an electron will have a component of velocity along the axis 15 of the electron beam. Thus, the effect of an electron crossing curve $a'_1$ of the equilibrium path is analogous to a simple pendulum in that there are forces acting which tend to restore it to an equilibrium position.

Figure 3:
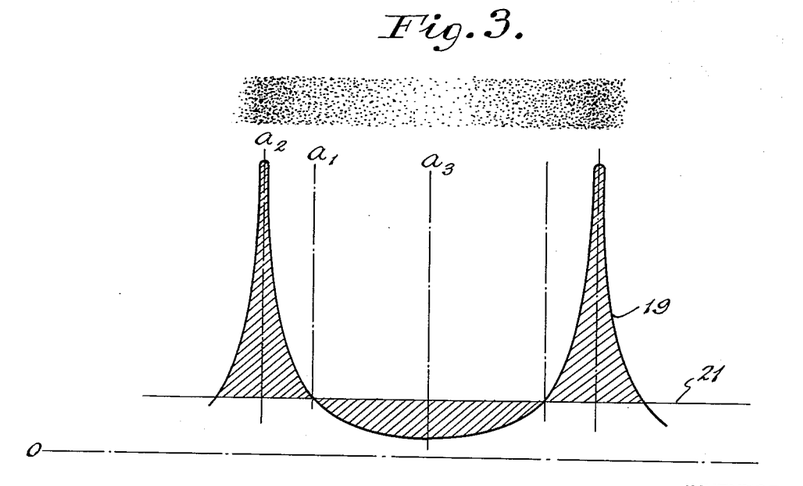
Fig. 3 is a diagrammatical representation including a curve of the distribution of electrons which have undergone density modulation.

It will be noted that in Fig. 3 the various portions of the electron beam, such as the bunched portion $a_2$ and the anti-bunched portion $a_3$ follow the curves $a''_2$ and $a''_3$, respectively, as is shown in Fig. 2, thereby permitting the collection of spurious electrons, such as the out-of-phase electrons $a_3$ prior to their interaction with gap 13, which may be the gap of the catcher or output resonator. It will also be noted that the beam trajectory as shown in Fig. 2 is of an undulating or perturbative character; the production of deliberate perturbations in the beam being useful for controlling its trajectory and particularly obtaining a suitable trajectory with a relatively small magnetic field strength.

Such a controlled trajectory is particularly beneficial in instances where it is necessary to employ a magnetic field of varying field strength along the axis of the electron beam; such as may be the case where resonators (not shown) coupled to gaps 11—13 are employed. Such resonators, together with their coupling elements, may make difficult the use of magnetic field means uniformly distributed along the length of the electron beam. The electrons of the beam cross curved magnetic lines of force at a region where the beam first enters the magnetic focusing flux, the beam being focused by electrostatic focusing means prior to entrance in this region. The aforementioned region is located along the axis 15 to the left of gap 11 in Fig. 1. The resulting deflection of the beam electrons by the magnetic flux causes the outer beam electrons to undulate about the equilibrium path $a'_1$, the nature of the undulations being determined by the radius of the beam and the angle at which the outer beam electrons initially cross the equilibrium path $a'_1$. By providing a varying magnetic field along the beam axis 15 between the planes of gaps 11 and 13, and therefore a varying equilibrium path such as $a'_1$ for the average electron bunches, the aforementioned undulations or perturbations can be modified so that the outer electrons of these average bunches will follow a trajectory such as curve $a''_1$ in Fig. 2. If the average bunched electrons are made to follow curve $a''_1$ in Fig. 2, the anti-bunch portions of the electron beam will follow curve $a''_3$ because of the reduced perveance of the beam at these portions. Since curve $a''_3$ is displaced away from the axis 15 in the region of portion 18 by a distance which is equal to or larger than the radius of the inner wall of the reduced diameter portion 18 of drift tube 16, the anti-bunch electrons are dissipated thereat.

A more precise discussion of the manner in which the curves $a''_1$, $a''_2$, $a''_3$ of the beam trajectories of Fig. 2 are derived will be discussed in connection with Fig. 4, wherein there is assumed a constant magnetic field along the length of the electron beam. Similarly, in connection with Fig. 4 it is assumed that the electron density or perveance of the beam remains constant. In this connection, the equilibrium radius as previously defined in Equation 1 becomes a constant $a$, which has the dimensions of a length and, in this respect, is useful, among other things, for normalizing linear dimensions.

In the analysis which follows a more general term for the equilibrium radius will be employed to take account of situations in which a varying amount of magnetic field is coupled to the cathode region. It may be said that the equilibrium radius becomes larger as the amount of flux density in the cathode region increases. The notation used is consistent with that employed by the present applicant in the above-referred-to paper entitled, "Electron beams in axially symmetrical electric and magnetic fields."

For an electron beam under the influence of a constant magnetic field there is one particular equilibrium radius at which the radial acceleration of the outermost or edge electrons is zero. Were an electron beam to be started at this radius with zero radial velocity, the beam could be maintained indefinitely with the same cross section. The equilibrium radius $r_e$ may be expressed in normalized units, as follows:

$$R_e = \frac{r_e}{a} \qquad (2)$$

Figure 4:
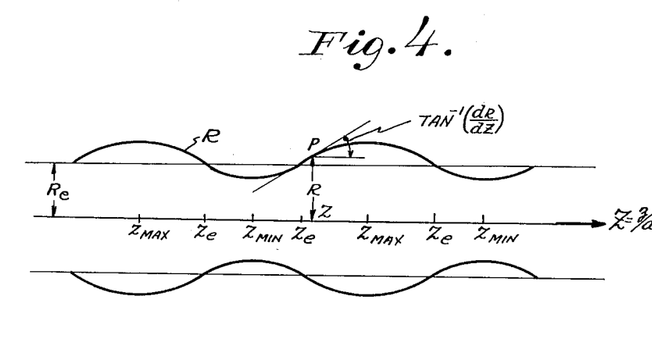
Fig. 4 is a further diagrammatical representation, which is useful for explaining part of the principles of the present invention.

Fig. 4, which is useful for defining the nomenclature employed, assumes a constant magnetic field and electron beam density along the Z-axis and schematically illustrates such beam with a wave motion of R relative to its axis Z. R may be defined in terms of $r$, the radius of the electron beam, and $a$, as follows:

$$R = \frac{r}{a} \qquad (3)$$

Similarly, Z is the normalized z co-ordinate and $Z_e$ is defined as the co-ordinate where the beam crosses the equilibrium radius, that is, the condition when the ratio of R to $R_e$ is unity. $Z_{max}$ and $Z_{min}$ correspond to the peaks and valleys of the normalized beam radius R.

To obtain the curves $a''_1$, $a''_2$, $a''_3$ of the electron trajectories of Fig. 2, the corresponding curves $a'_1$, $a'_2$, $a'_3$ of Fig. 1 may be employed singly. For instance, curve $a'_1$ of Fig. 1 may be considered. It will be noted that the equilibrium path of this portion $a'_1$ of the beam varies along the axis 15 due to the variations in either the strength of the magnetic field and the perveance, or both. To obtain the corresponding curve $a''_1$ of Fig. 2 it is convenient to consider intervals of the curve $a'_1$. Over the interval considered, the magnitude of $a'_1$ may be regarded as constant. Stated in terms of the more general relationships to account for the penetration of the cathode region by magnetic flux, $r_e$ or the normalized equilibrium radius $R_e$ may be considered constant over the interval considered.

For convenience, numerical subscripts may be associated with the quantities $R$ $(dR/dZ)$, and so on to relate such quantities to a selected point along the Z-axis. By starting with the normalized beam angle $(dR/dZ)_1$ and radius $R_1$ for a particular $Z_1$ at the beginning of an interval of the curve of $a'_1$, the normalized beam angle $(dR/dZ)_2$ and radius $R_2$ for a point $Z_2$ at the end of the interval may be determined. By use of the normalized beam radius $R_1$ the normalized beam potential function $P(R_1)-P(R_e)$ may be determined by reference to Fig. 4 of the above-referred-to paper.

With the other given quantity, that is, the normalized beam angle $(dR/dZ)_1$ for the particular $Z_1$ together with the value of the graph-determined normalized potential function, it is possible to determine $(dR/dZ)_{max}$ by use of the following:

$$\left(\frac{dR}{dZ}\right)^2 = \left(\frac{dR}{dZ}\right)^2_{max} - \frac{0.01515\overline{K}}{v_z^2}[P(R)-P(R_e)] \quad (4)$$

In this Equation 4 $v_z$ is the velocity of the electrons along the Z-axis normalized by dividing by $\sqrt{2eV_b/m}$ where $e$ and $m$ are the charge and mass of an electron, respectively.

With $(dR/dZ)_{max}$ together with $R_1/R_e$ by use of Fig. 6 of the above-referred-to paper, the quantity $$Z_1 - Z_e$$

may be determined. It will be recalled that $Z_2-Z_1$, that is, the normalized length of the interval under consideration, is known. By use of this together with the value of $Z_1-Z_e$, $Z_2-Z_e$ may be determined, which in turn by reference to Fig. 6 of the above-referred-to paper yields the magnitude of the ratio $R_2/R_e$. The magnitude of this quantity makes possible, by use of Fig. 4 of the above-referred-to paper, the determination of the normalized potential function at the point $Z_2$, which together with the previously-determined $(dR/dZ)_{max}$ permits by use of Equation 4 the calculation of the normalized beam angle $(dR/dZ)_2$ at the end of the interval, $Z_2$.

In order to trace the beam trajectory $R$ relative to the normalized equilibrium radius, $R_e$, the normalized beam angle and radius, determined in the manner indicated above, may be employed as the initial conditions or given quantities for analyzing an adjacent interval.

It is possible to dispense with the use of the curves of Fig. 6 of the above-referred-to paper by utilizing the following relationship:

$$\frac{\sqrt{\overline{K}}}{v_z}\frac{Z-Z_e}{R_e} = \int_{R_e}^{R}\frac{\pm d\left(\frac{R}{R_e}\right)}{\sqrt{0.01515}\left[\frac{\left(\frac{dR}{dZ}\right)^2_{max}v_z^2}{0.01515\overline{K}}-[P(R)-P(R_e)]\right]^{1/2}}$$

as is set forth in Equation 5 of the above-referred to paper.

Figure 5:
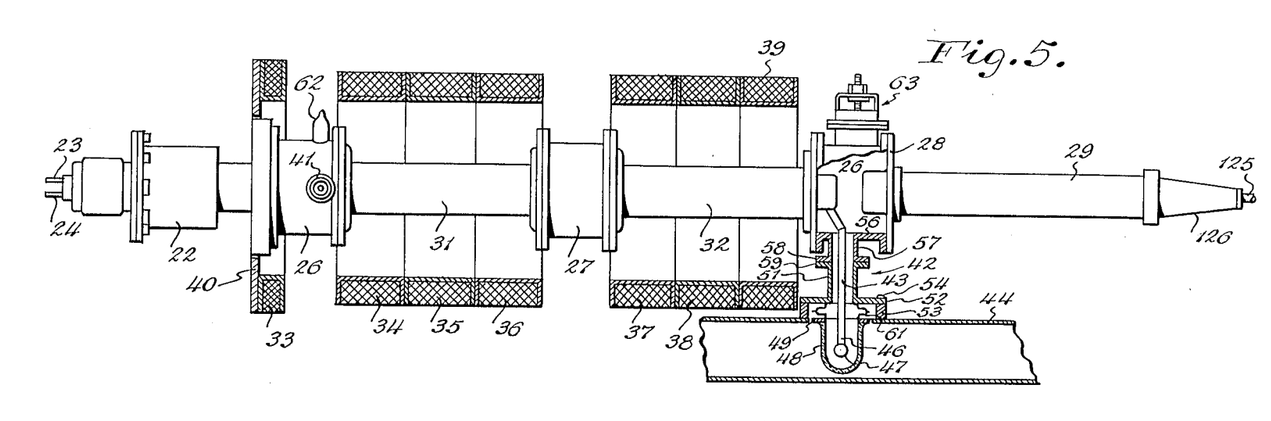
Fig. 5 is a longitudinal view, partly in cross-section, of an electron discharge device according to the present invention.
Figure 6A:
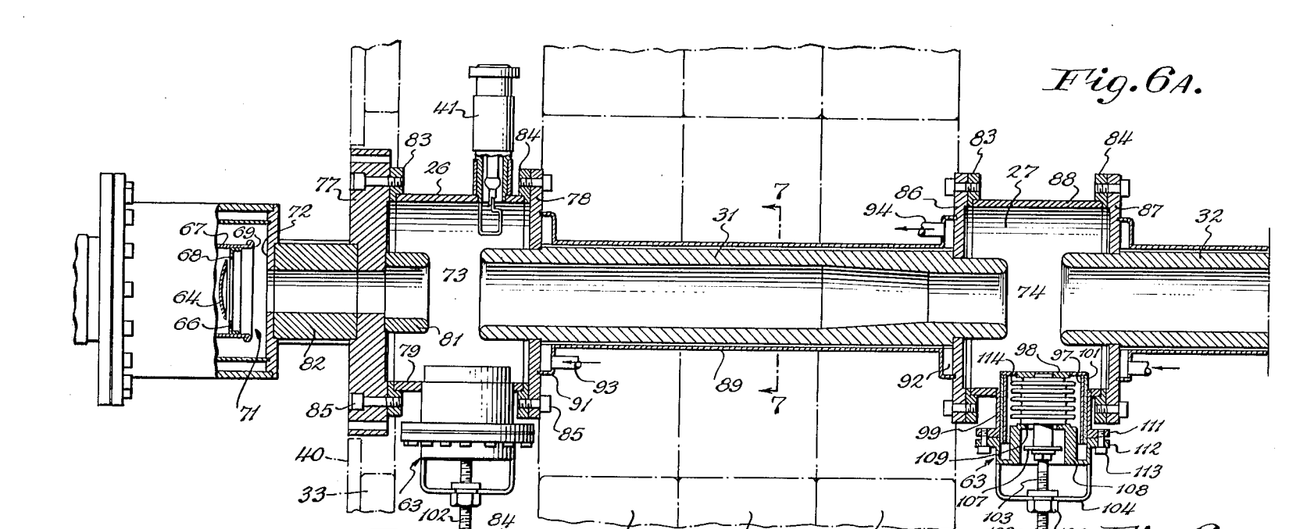
Figs. 6A and 6B are enlarged views, mainly in cross-section, of the device of Fig. 5.

Referring to Figs. 5 and 6A, a velocity modulation device is provided with a means for producing an electron beam including a cathode-focussing electrode assembly 22 which may be energized by means of leads 23, 24. Means are provided including resonators 26—27 for velocity modulating an electron beam, and means are provided including resonator 28 for abstracting energy from the beam, with the collection of the spent portion of the electron beam occurring in the electron collector 29. Between the resonators 26—28, drift tubes 31, 32 are located, wherein the beam may undergo density modulation.

Means including the solenoids 33—39 for confining the electron beam to a desired trajectory during its transit from the assembly 22 throughout the drift tubes 31, 32 and resonators 26, 27, 28 are provided. Magnetic means including solenoids 34—36 are provided for producing a magnetic field or flux density in a region along the path of the electron beam, that is, substantially during its transit through drift tube 31. Further magnetic means including solenoids 37—39 provide a magnetic field or flux density in another region along the path of the electron beam, that is, in its transit substantially through drift tube 32. In order to suitably confine the electron beam, which undergoes density modulation, the strength of the magnetic field provided by the magnetic field arising from solenoids 37—39 has greater strength than the magnetic field arising from solenoids 34—36. Similarly, the magnetic means including solenoid 33 for confining the electron beam to a desired trajectory provides a field strength less than that arising from the solenoids 34—36. Stated somewhat differently, the solenoids 33—39 provide a magnetic field which increases on the average along the path of the beam. If desired, an apertured disc 40 may be employed in connection with solenoid 33, which disc 40 may be of magnetic material.

In order to couple electromagnetic energy into the buncher or input resonator 26 a coaxial line terminal post 41 is provided; to extract electromagnetic energy from the catcher or output resonator 28 a coaxial transmission line 42 is provided, which line 42 has an inner conductor 43 extending into waveguide 44 to provide an electromagnetic energy launching probe 46. The end of the probe 46 extending into waveguide 44 is provided with a substantially spherically-shaped knob 47, thereby avoiding sharp points which might give rise to arcing. Surrounding the probe 46 is a vitreous dome 48 which is secured in a vacuum-tight manner to a ring 49, which is preferably made of a material readily sealable to glass, such as Kovar.

A portion of the outer conductor of transmission line 42 is formed by tubular member 51, which is provided with a flange 52, which may be mechanically secured to the waveguide 44 by means of ring 53 and screw 54. Shell 56 forms a portion of the wall of resonator 28 and is provided with a radially-extending tubular portion 57, which also forms a portion of the outer conductor of the transmission line 42. Tubular portion 57 is provided with a flange 58 which cooperates with a flange 59 of tubular member 51 to form a vacuum-tight connection therebetween. Similarly, the flange 52 of tubular member 51 is connected to the ring 49 by means of a bellows 61 in a vacuum-tight joint so as to maintain the internal vacuum of the electron discharge device.

In order to minimize spurious reflections of electromagnetic energy the cavity formed by the ring 49, bellows 61, flange 52 and ring 53 may be filled with a suitable material, such as copper wool. In order to effect the evacuation of the electron discharge device a pinch-off tube 62 is provided. For the adjustment of the resonator frequency of the output resonator 28 a tuner 63 is provided, which is similar to that illustrated more fully in Fig. 6A and will be described in detail hereinbelow.

Referring to Fig. 6A, aligned along the longitudinal axis of the electron discharge device is an electron beam producing means, which includes a means for supplying electrons, such as cathode button or emitter 64, the upper surface of which is suitably oxide coated and substantially spherically concave in cross-section about the longitudinal axis. The edge of the apertured cup 66 which is supported by sleeve 67, provides a first line conductor or edge 68 positioned outwardly of and along the longitudinal axis in a direction away from the cathode button 64. Accordingly, it will be noted that the diameter of the aperture of cup 66 is larger than the diameter of the cathode button 64.

The end of the sleeve 67, in a direction toward the main body of the electron discharge device, provides a second line conductor or edge 69, with the second edge 69 being located outwardly of the cathode button 64 to a greater extent than the first edge 68. The second edge 69 is, in addition, disposed along the longitudinal axis in a direction away from the cathode button 64 to a greater extent than the first edge 68. The first and second line conductors 68, 69, constitute an electrostatic field forming means or focusing electrode 71.

For accelerating and directing electrons emanating from the cathode button 64 toward the main body of the electron discharge device an accelerating electrode or anode 72 is provided, which anode is suitably energized relative to said cathode button 64 by an external potential source, as discussed hereinbelow. Under the influence of the focusing electrode 71 and the anode 72 a high density electron beam is formed, in which the individual electrons thereof traverse substantially rectilinear trajectories and travel toward a point. In order to exclude the magnetic flux produced by solenoids 33—39 from the cathode assembly 22 as was mentioned above, anode 72 and the outer sleeve of assembly 22 are composed of magnetic material such as is disclosed in application S. N. 117,187 mentioned above. The electrode 71 and anode 72 may be designed according to the principles disclosed in the aforementioned Patent No. 2,564,743.

Electromagnetic field defining means are positioned to receive or be traversed by this electron beam successively in energy exchanging relation. The electromagnetic field defining means may include cavity resonators 26, 27 and 28, with each being provided with an electron-permeable region or gap 73, 74 and 76, respectively, through which the electron beam passes. Stated somewhat differently, the resonators 26, 27 constitute a means for velocity modulating an electron beam or a means for providing a density modulated beam, and resonator 28 constitutes a means for abstracting energy from the electron beam.

Resonator 26 is substantially formed by end walls 77, 78, shell 79, tube 81 and lower portion of drift tube 31, with all of these parts being provided with highly conductive inner surfaces to minimize radio frequency losses. Tubular member 82 extends between the anode 72 and the end wall 77 of resonator 26 with the connections being effected in a vacuum-tight manner. Similarly, apertured discs 83, 84 are connected in a vacuum-tight manner to the end walls 77, 78 by means of screws 85. The connections between the shell 79 and the apertured discs 83, 84 are similarly of a vacuum-tight nature, which may be achieved for instance by employing a copper wire gasket (not shown) between the apertured discs 83, 84 and the end walls 77, 78, respectively. The drift tube 31 is similarly joined to the end wall 78.

Extending radially from the resonator 26 is a coaxial transmission line 41, which is useful for introducing electromagnetic energy into the resonator 26 and has the same form as that shown in application Serial No. 161,684, entitled "High Frequency Apparatus," in the name of Carol M. Veronda, filed May 12, 1950, now Patent No. 2,680,209, issued June 1, 1954.

Resonator 27 is substantially formed with end walls 86, 87, shell 88 and has extending therein the opposed ends of the drift tubes 31, 32, respectively. To preserve the internal vacuum of the device the connections between the ends of the drift tubes 31, 32 and the end walls 86, 87 are of a vacuum-tight construction. The same considerations apply as those previously discussed in connection with resonator 26 regarding vacuum-tight joints and types of materials.

Extending between the end wall 78 of resonator 26 and the end wall 86 of resonator 27 and substantially surrounding the drift tube 31 is a jacket 89 having an input header 91 and output header 92 to which input pipe 93 and output pipe 94 are connected, respectively. By introducing a cooling liquid into the input header 91, as is shown more clearly in Fig. 7, the cooling medium is made to pass along the outer surface of the drift tube 31, which is provided with longitudinal slots 96.

In order to vary the frequency or tune resonators 26—28, a tuner 63 is provided including a cylindrical member 97 having an end wall means 98, which are rigidly attached and may be advanced or retarded to occupy a larger or smaller volume in the resonator 27. The shell 88 of resonator 27 is provided with a tubular member 99 which extends radially therefrom and is preferably positioned coaxially with relation to cylindrical member 97. Interposed between the tubular member 99, which is rigidly secured in a vacuum-tight manner to the shell 88, and the cylindrical member 97, are a plurality of vitreous rods 101 which function as bearings and are preferably arranged coaxially with respect to the cylindrical member 97 and symmetrically disposed along the periphery thereof.

An actuating rod 102 is provided with a threaded portion 103 which cooperates with bridge 104 and nut 106, whereby its axial movement may be controlled. The actuating rod 102 is rigidly secured to the end wall means 98 and provided with a disc 107, which is spaced from supporting member 108, with the disc operating as a stop in cooperation with the inwardly directed flange 109 of the supporting member 107 to limit the axial movement of the actuating rod 102. The tubular member 99 is provided with an end flange 111 which cooperates with a flange portion 112 of the supporting member 108, together with screws 113 to form a vacuum-tight connection. Similarly, the end of the supporting member 108 is connected to the end wall means 98 through the bellows 114 to effect a similar purpose.

Figure 6B:
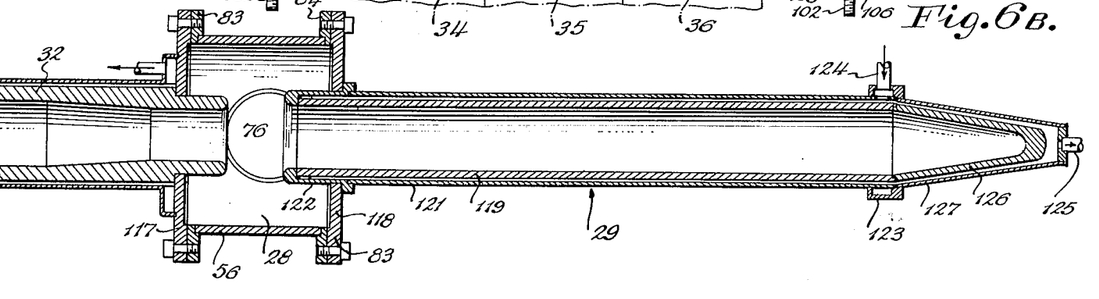

Resonator 28 is substantially formed with the shell 56 having apertured discs 83, 84 at the ends thereof cooperating with end walls 117, 118 which are secured to the apertured discs 83, 84 by means of screws 83. These parts are formed of materials having highly conductive surfaces and joined together in vacuum-tight connections, in the same manner as that previously described, for instance, in connection with resonator 27.

A further portion of the resonator 28 is formed by the extension therein of the end of drift tube 32. The end of the collector 29, which is formed of a tube 119 surrounded by jacket portions 121, 122, has its end extending into the resonator 28 to further define a portion of the boundary thereof.

The internal diameter of the drift tubes 31, 32 is small relative to the diameter of the electron beam passing therethrough, which beam, of course, due to the perturbations therein has a non-uniform diameter. The use of a small diameter for the drift tubes 31, 32 results in a larger beam coupling coefficient and a higher shunt impedance, both of which factors tend to increase the output efficiency. It will also be noted that the means defining the gaps 73—75, including the ends of drift tubes 31, 32, tube 81 and jacket portion 122, are staggered in diameter, thereby minimizing the possibility of multipactor effect such as is discussed in the above mentioned application Serial No. 117,187.

Figure 7:
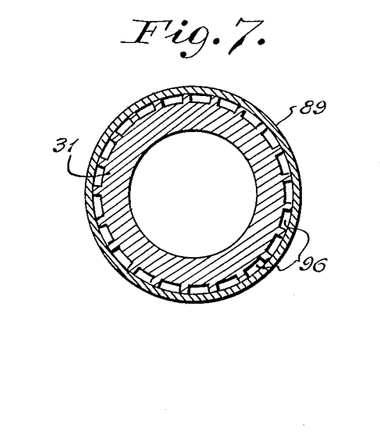
Fig. 7 is an enlarged cross-sectional view taken along lines 7—7 of Fig. 6A.

To preserve the internal vacuum of the electron discharge device, the jacket portion 122 is joined in a vacuum-tight connection to end wall 118 and the end of tube 119. The outer periphery of the tube 119 is formed with longitudinally extending slots in a manner somewhat analogous to the slots 96 of the drift tube 31 as shown in Fig. 7. However, the slots are formed in such a manner to permit a cooling liquid introduced through input header 123 by means of input pipe 124 to traverse the length of the tube 119 to the region of the jacket portion 122 and be returned along another longitudinal slot to the end of the collector 29 most remote from resonator 28 for extraction therefrom through output pipe 125. A conically shaped member 126, which is disposed at the end of tube 119 and connected thereto in a vacuum-tight joint, is surrounded by jacket portion 127.

In operation, an electron beam emanating from the cathode button 64 converges toward a point in the vicinity of the anode 72 under the influence of an electrostatic field forming means, such as focusing electrode 71. Such an electrostatic focused beam enters the region of the magnetic field provided by solenoid 33, which field is substantially directed along the axis of the discharge device. It will be understood that a portion of the field lines will tend to curve with respect to the longitudinal axis in a region where the electrostatically focused beam first enters the magnetic field region, the beam entering into this region at an angle with respect to the equilibrium path thereof for causing the beam diameter to undulate as the beam progresses beyond this region.

The electron beam in traversing the buncher or input resonator 26 is subjected to velocity modulation, which will give rise to some density modulation thereof during the transit of the beam through drift tube 31. Such a slightly density modulated beam in traversing resonator 27 is effective for sustaining oscillations therein and undergoes further velocity modulation, which gives rise to additional density modulation thereof during the transit of the beam through drift tube 32. With such an additional density modulated beam traversing the output resonator 28, electromagnetic oscillations will be excited therein. Such electromagnetic oscillations may be coupled to the output waveguide 44 by means of the output coaxial transmission line 42. It will be noted, that the electron beam is subjected to cascade bunching, the principles of which are more fully stated in the aforementioned Patent No. 2,680,209.

In order to confine the electrons to desired trajectories during their transit from the cathode-focusing electrode assembly 22, and more specifically from the region where the electron beam leaves the influence of the focusing electrode 71, to the collector 29, magnetic means including solenoids 33—39, are provided. Such solenoids 33—39, which are preferably arranged substantially coaxially with respect to the longitudinal axis of the discharge device, are effective for providing an axially directed magnetic field. However, due to the interruption or lack of such solenoids along the beam path, for instance, in the region of the resonators 26—28, it will be noted that the field strength will vary and have components extending radially with respect to the longitudinal axis in these regions. Also the magnetic flux will have components which curve and extend radially at the region of entry of the electrostatically focused beam therein. As discussed hereinabove in connection with Figs. 1–4, the equilibrium radius is the radial distance from the axis of the beam, which substantially coincides preferably with the longitudinal axis of the discharge device, at which the mutual repulsion forces of the electrons at the edge of the beam balance the forces of the magnetic fields provided by the solenoids 34—39. The electron beam trajectories for the various components of the electron beam in terms of perveance have been discussed hereinabove, most specifically in connection with Figs. 2 and 4.

In order to maintain the desired electron beam trajectories, the magnetic fields provided by the solenoid 33, a group of solenoids 34—36 and group of solenoids 37—39 are of progressively greater magnitude. To this end, all of the solenoids 34—39 may be of the same size, that is, may be suitable for providing the same magnetic field strength when energized by the same current. In order to obtain the desired tapered magnetic field along the path of the electron beam or to provide for an increasing magnetic field on the average along this path, the magnitude of the current employed for energizing solenoids 36—39 may be greater than that employed for energizing solenoids 34—36. In other words, each of the solenoids forming the group 34—36 may be provided with the same magnitude of energization current. However, if desired the value of the magnetization current employed in connection with each of solenoids 36—39 may be progressively increased along the axis of the electron beam.

It will, of course, be understood that the desired variation in the strength of the magnetic field, or ampere-turns, may be obtained by varying the size of the solenoids 33—39 and employing the same magnitude of current with each.

In order to obtain a satisfactory entrance angle and radius of the electron beam relative to the curve of the equilibrium path, as discussed in connection with Fig. 1, a means for controlling the electron beam prior to its entrance into the magnetic field is provided, which means may take the form of the previously discussed focusing electrode 71. Such an electrostatic control arrangement has the advantage of obviating the necessity for the use of magnetic means for controlling the trajectories of the electrons in the cathode or during their presence in the cathode-focusing electrode assembly 22. Furthermore, the arrangement of the assembly 22 is particularly effective for obtaining the desired control of electrons with the exclusion of the magnetic field therefrom, anode 72 and the outer sleeve of assembly 22 being of magnetic material as was mentioned above.

It will also be noted that the electron beam throughout its transit of the discharge of the device is subjected to magnetic forces which balance the mutual repulsion forces of the electrons of the beam, thereby minimizing transverse debunching. In addition, the electron beam is controlled in such a manner that the fewer electrons between the bunches or concentrations, that is, the anti-bunches, represented by $a_3$ in Fig. 3, are substantially dispersed or scattered so that they may be collected by the walls of the drift tube 32 in the vicinity of the tapered reduced diameter section of tube 32 as is shown in Fig. 6B. In this manner they are excluded from interaction with the output resonator 28 thereby increasing the power output. The paths of the electron bunches and anti-bunches at this reduced diameter section of tube 32 are similar to the paths $a''_1$ and $a''_3$, respectively, at portion 18 in Fig. 2 because of the controlled perturbations in the beam.

While in the particular electron discharge device shown in Figs. 5 and 6, which is intended for high power operation, as will appear more fully hereinbelow, a tuner 63 is employed, it will be understood that, if desired, depending largely on design considerations, flexible walls or diaphragms may be employed. This could take the form of constructing end wall 118 resonator 28 of flexible material which would enable a variation in the spacing of the gap 75. With the particular discharge device in question, there is a very low capacitance between the extremely large gaps 73—75 so that the motion required for any sizeable frequency change would be prohibitive. In addition, a variation in the size of the spacing of the gaps 73—75 would result in a change in the electron transit angle. Similarly, in view of the high power operation of the device, it is preferable to form the gaps 73—75 without the use of grids, thereby reducing the loss of beam current through electron interception and minimizing the problem of heat dissipation developed in such grids by beam interception.

If desired, the device of Figs. 5 and 6 may be provided with an interlock arrangement (not shown) so that in the event there is an interruption in the flow of the cooling water or the field current for solenoids 33—39, the device becomes inoperative, thereby minimizing the possibility of damage thereto.

While the invention has been illustrated in connection with an electron discharge device having three resonators 26—28 and employing cascade bunching, it will be understood that it is equally applicable to any klystron or velocity modulation device in which it is desired to more precisely confine the electrons to desired trajectories, with the added advantage of obtaining this result with a relatively small magnetic field.

With regard to the typical operating condition of the discharge device of Figs. 5 and 6, with a beam power input of 5.4 megawatts and a nominal peak beam voltage of 140 kilovolts, a radio frequency peak output of two megawatts may be obtained at a frequency of 850 megacycles, with a pulse length of 30 microseconds and a duty cycle greater than 0.004, providing a power gain of 30 db and a plate efficiency of 35%. It will be understood that such operating conditions are to be construed as illustrative and not in a limiting sense.

Figure 8:
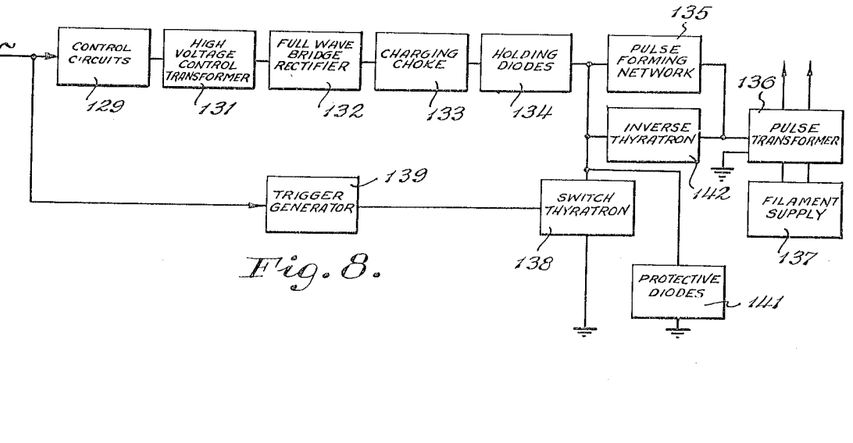
Fig. 8 is a block diagram showing a portion of the energizing circuit employed in connection with the device of Figs. 5 and 6.

With regard to Fig. 8, a description of the parts and operation of which will be presented simultaneously, a 60 cycle-three phase source (not shown) is connected through a control circuit 129 to the primaries of a step-up high-voltage control transformer 131. The resultant high voltage output of the transformer 131 is rectified in a three-phase full-wave bridge rectifier 132, which is in turn connected through a charging choke 133 and holding diodes 134 to a pulse-forming network 135. The output of the pulse-forming network 135 is applied to the primary of a pulse transformer 136, to which a filament supply 137 is also connected. The output leads of the pulse transformer extend to the leads 23, 24 (Fig. 5) to provide the filament voltage and pulsed klystron beam voltage for the device of Fig. 5. To accomplish this end, the filament supply may be connected to the cathode button 64 (Fig. 6) which in turn is insulated from the anode 72, which together with the main body of the device, including for instance resonators 26—28, may be maintained potential. The focusing electrode 71 may be maintained at the potential of the cathode button 64.

By reason of the holding diodes 134, the generation of pulses having a variety of repetition rates are facilitated, as for instance, 30, 60 or 120 pulses per second. A switch thyratron 138 is connected from the input of the pulse-forming network 135 to ground and may be controlled by trigger generator 139, which generator 139 may be adjusted with respect to the 60 cycle line voltage by means of a phase shifter included therein. Also, connected between the input of the pulse-forming network 135 and ground are protective diodes 141 which provide protection against arcs in the electron discharge device of Figs. 5 and 6 or the pulse transformer 136. To prevent the impressing of excess inverse voltage across the switch thyratron 138, an inverse thyratron 142 may be connected to conduct in an opposed direction and triggered when the inverse voltage causes sufficient current to flow through the protective diodes 141. With the use of the circuit of Fig. 8, 30 microsecond pulses at 120 pulses per second may be conveniently obtained.

Figure 9:
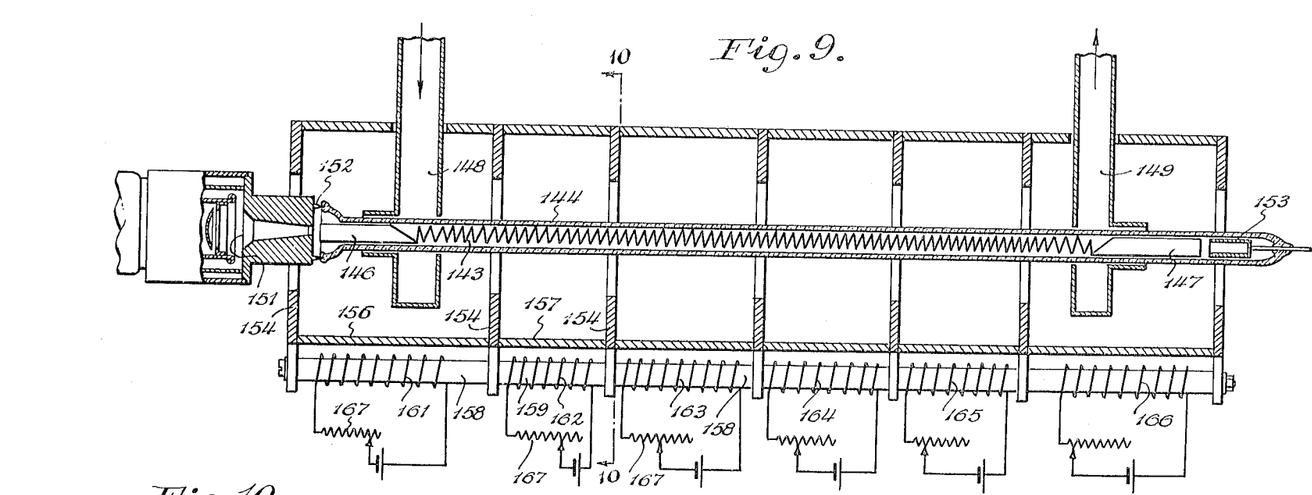
Fig. 9 is a longitudinal view, mainly in cross-section, of a further electron discharge device according to the present invention.
Figure 10:
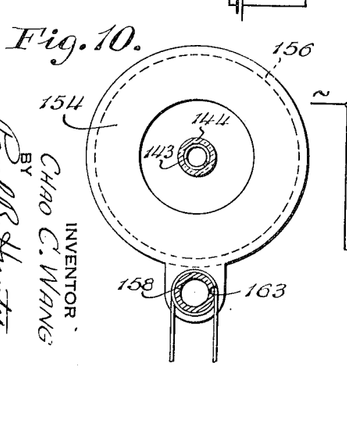
Fig. 10 is a view taken along lines 10—10 of Fig. 9.

Referring to Figs. 9 and 10, the electron discharge device includes a means for providing a slow wave propagating structure, such as cylindrical helix 143, which is surrounded by vacuum envelope means, such as vitreous tube 144. Hollow tubes 146, 147 are arranged at each end of the helix 143 and cooperate with means for coupling energy thereto, which means may take the form of electromagnetic field defining means comprising input waveguide 148 and output waveguide 149.

Means for producing an electron beam may substantially take the form of the cathode assembly 22 described in connection with Fig. 6A. The anode 151 is provided with a lip 152 by means of which vacuum tight sealing to the vitreous tube 144 may be effected. Arranged at the end of hollow tube 147 is a collector 153 by means of which spent electrons of the beam may be removed from the vitreous tube 144. Means for confining the electron beam to a desired trajectory throughout its transit of the vitreous tube 144, and more specifically, its transit of helix 143, are provided. Such means may include apertured discs 154, shells 156, 157 which are provided, which cooperate with yokes 158, 159 and coils 161—166. The discs 154, shells 156, 157 and yokes 158, 159 are formed of a magnetic material in order to produce a magnetic field along the axis of the electron beam. To achieve a variation in the strength of the magnetic field along the path of the beam in the direction of electron flow the magnetic field strength provided by coils 161—166 may be varied as, for instance, varying the magnetization current therethrough with the aid of current control circuits 167. Thus, for instance, the coils 162—165 may be of the same size with the variation in the magnetic field obtained by varying the energization current thereof.

Shell 156, for instance, is provided with a suitable aperture to accommodate waveguide 148.

In operation, an electron beam traverses the axis of the helix 143 to effect a substantially continuous interchange of energy therewith. During such transit the electron beam receives and delivers energy to the helix 143, which may be energized by the coupling thereto of a suitable electromagnetic wave by means of input waveguide 148. Electromagnetic energy may be coupled to a utilization device (not shown) by means of output waveguide 149. The electrons during such energy interchanges with the helix 143 are subjected to a velocity modulation process with subsequent density modulation so that means including helix 143 are provided for segregating the electrons into concentrations, in a manner analogous to that previously described in connection with the device of Figs. 5 and 6.

The magnetic focusing means including the discs 154, shells 156, 157, yokes 158, 159 and coils 161—166 are effective for providing means defining an equilibrium path along the path of the beam, which, owing to the variation in the magnetic field strength along the axis of the beam, will be variable, as hereinabove discussed. With the interchange of energy between the electron beam and the helix 143, the electrons of the beam become velocity modulated, which subsequently gives rise to a density modulation of the beam. In this manner, the perveance of the electron beam varies along the length of the helix 143, in a manner similar to that previously described in connection with the device of Figs. 5 and 6, causing different equilibrium paths for the bunched portions, antibunch portions, and the portions of the beam having average electron density, respectively.

In order to obtain the most desirable electron beam trajectory, it is advisable to increase the magnetic field strength on the average along the axis of the helix 142. This may take the form of progressively increasing the field strength provided by the coils 161—166. By progressively increasing the magnetic field strength along the axis of helix 143 the progressively increasing transverse debunching forces in the bunched portions of the beam can be compensated. This will result in an equilibrium path for the bunched portions of the beam which is displaced by a substantially constant distance from the axis of helix 143 along the beam path. This results in more complete interaction between the beam and the electromagnetic travelling wave along helix 143. If desired, however, in a manner somewhat analogous to that previously described in connection with Fig. 5, adjacent coils such as coils 163, 164, for instance, may provide substantial identical magnetic fields. Moreover, it is possible to remove one of the sections such as coil 164 in a manner similar to that previously described. In addition, the desired variation in the magnetic field along the helix 143 may be obtained by a suitable selection of the discs 154 in terms of size of permeability.

In connection with the solenoids 33—39 of Figs. 5 and 6 current control circuits, such as circuits 167, may be employed. Moreover, if desired, the magnetic means or electromagnets, including discs 154, shells 156, 157, yokes 158, 159, coils 161—166, and circuits 167 may be substituted in the device of Figs. 5 and 6 with suitable modifications to accommodate coupling means, including for instance waveguide 44.

Figure 11:
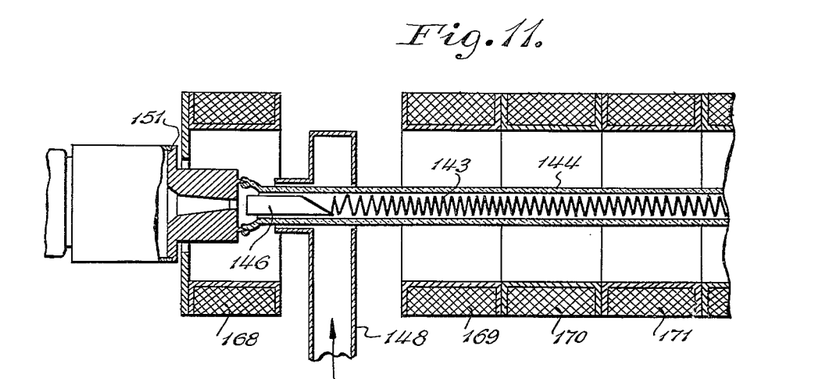
Fig. 11 is a fragmentary view, mainly in cross-section, of an alternate arrangement for the device of Fig. 9.

Referring to Fig. 11, a modified arrangement for the device of Fig. 9 for obtaining the desired magnetic field is shown, which may take the form of a plurality of solenoids 168—171, which may be of the same size. The variation in the magnetic field strength provided by the coils 168—171 may be achieved by varying the amount of magnetization current employed or their size. The considerations and modifications previously discussed herein, in connection with, for instance, solenoids 33—39, apply.

Figures 12, 13:
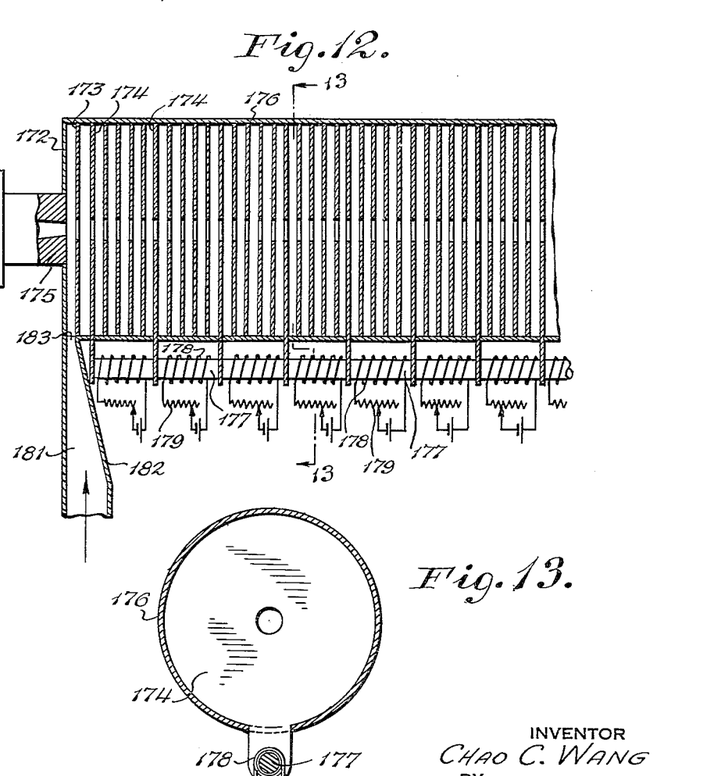
Fig. 12 is a longitudinal view, mainly in cross-section, of a further electron discharge device according to the present invention.
Fig. 13 is a view of a portion of the structure of Fig. 12 taken along lines 13—13 thereof.

Referring to Figs. 12 and 13, means for obtaining a slow wave propagating structure are provided, which means may take the form of a plurality of apertured discs 172, 173, 174 having their apertures registering with the electron beam emanating from anode 175. In addition, a means for confining the electron beam to a desired trajectory is included, which means may take the form of certain of the apertured discs 172—174 which are effective for providing a part of the means defining a slow wave propagating structure, such as discs 174, which are formed of magnetic material and extend beyond the shell means 176 to cooperate with yokes 177, surrounded by coils 178. To energize the coils 178, current control circuits 179 are employed.

Thus, it will be noted that the disc 172—174 cooperate with the shell means 176 to provide a means defining an electromagnetic field region and accordingly are formed of highly conductive surfaces to minimize radio frequency losses. This may be accomplished by forming the parts 172, 173, 176 of silver or copper or of a substance plated with these metals. It will be understood that the discs 174, which cooperate with yokes 177, are formed of magnetic material, which may be suitably plated. In addition, the shell means 176 together with the discs 172, 174 form a portion of the vacuum envelope of the device and accordingly the connections are made in a vacuum tight manner. To the same end, the disc 172 is joined to anode 175 in a similar manner.

Coupling means, such as input waveguide 181, are employed which have a tapered wall 182 to facilitate the introduction of electromagnetic energy into a section of the slow wave propagating structure, such as defined by disc 172, 173. An iris 183 may be employed to minimize reflections of electromagnetic energy. A window (not shown) suitable for maintaining the internal vacuum may be employed at the iris or in the waveguide 181 at a suitable distance from the shell means 176 to facilitate fabrication.

Thus, there is provided in connection with the devices of Figs. 9–13, field means, including for instance discs 174 and coils 178, for controlling an electron beam, with the strength of the field increasing on the average along the path of the beam.

If desired, the length of the yokes 177 may be varied to enable the use of various numbers of non-magnetic discs 173 between the discs 174 of magnetic material. The same considerations, with regard to the construction of the coils 178, and their energization, as well as any interruption in the magnetic field along the length of the shell means 176 by the omission of one or more of the coils 178, apply as previously discussed hereinabove, and particularly in connection with Fig. 9, except that the slow wave propagating structure, such as discs 172–174, and the vacuum-tight properties may not be impaired. In addition, the operation is similar to the device of Fig. 9.

It is apparent that many changes could be made in the construction of the devices of Figs. 5–13 and that many apparently different embodiments of the invention could be made without departing from the scope thereof. For instance, the invention may be employed in klystron tubes, traveling wave tubes or in any device wherein it is desired to more accurately control an electron beam. The means for confining electrons to desired trajectories may take a variety of forms, including for instance solenoids and electromagnets. Accordingly, it is intended that all matter contained in the above description or shown in the accompanying drawings shall be interpreted as illustrative and not in a limiting sense.

What is claimed is:

1. Electron beam forming apparatus, comprising means including a cathode and electrostatic focussing means for producing and directing an electron beam along a predetermined axis, means adjacent said axis for segregating the electrons of said beam into concentrations along a region spaced from said cathode, said concentrations being of increased density along said region in the direction of progression of said beam along said axis, and magnetic focussing means adjacent said axis for producing longitudinal lines of magnetic force of varying flux density along said region for interaction with said beam therein, said magnetic focussing means including magnetically permeable shielding means adjacent said cathode for excluding magnetic flux from said cathode, and further including means cooperating with said shielding means for directing curving magnetic lines of force into the path of said beam at a predetermined location along said axis between said cathode and said region, the variations in density of the longitudinal lines of magnetic force produced by said magnetic focussing means being predetermined to maintain desired electron trajectories along said region of electron segregation for increasing the efficiency of said apparatus.

2. Electron beam forming apparatus as defined in claim 1, wherein said magnetic focussing means includes a plurality of spaced, magnetically permeable apertured discs having their apertures surrounding said axis.

3. Electron beam forming apparatus as defined in claim 1, wherein said means for segregating said electrons into concentrations includes a slow wave electromagnetic energy propagating structure.

4. Electron beam forming apparatus as defined in claim 3, wherein said magnetic focussing means includes means for progressively increasing the flux density of the longitudinal lines of magnetic force along said electromagnetic propagating structure in the direction of progression of said electron beam along said axis to thereby compensate for increased transverse debunching forces produced in said beam due to the increased density of electron concentrations along said region of electron segregation.

5. Electron beam forming apparatus as defined in claim 4, wherein said slow wave electromagnetic energy propagating structure comprises a helix.

6. Velocity modulation apparatus, comprising means including a cathode and electrostatic focussing means for producing and directing an electron beam along a predetermined path, electron permeable anode means spaced along said path from said cathode for accelerating said beam, velocity modulation means adjacent said path for interaction with said beam at a first region spaced from said cathode beyond said anode means, energy abstracting means adjacent said path for interaction with said beam at a second region beyond said first region, electron drift tube means along said path between said velocity modulation means and said energy abstracting means, said velocity modulation means and said drift tube means comprising means for segregating electrons in said beam into bunches and anti-bunches of electrons, and magnetic focussing means adjacent said drift tube means for producing magnetic flux along said path between said velocity modulation means and said energy abstracting means, said magnetic focussing means including means for producing longitudinal magnetic lines of force of varying flux density in said path between said velocity modulation means and said energy abstracting means, magnetically permeable means adjacent said cathode for shielding said cathode from said magnetic flux, and further including means cooperating with said shielding means for directing curved magnetic lines of force into the path of said beam at a predetermined location from said cathode, the relationships among the distance of said location from said cathode, the radius and angle of entry of said beam into the curved lines of magnetic force at said location, and the magnetic flux produced by said magnetic focussing means being predetermined to produce desired perturbations in the cross section of said beam for eliminating anti-bunches of electrons formed in said drift tube means.

7. Velocity modulation apparatus as defined in claim 6, wherein said drift tube means includes conductive means effectively reducing the inner diameter of said drift tube means at a predetermined section therealong, said conductive means being adjacent said second region and closer to said cathode than said second region, said conductive means comprising means for intercepting antibunched electrons which are displaced further from said axis than bunches of electrons in the vicinity of said section because of said perturbations in the cross section of said beam.

8. Velocity modulation apparatus as defined in claim 7, wherein said magnetic focussing means includes means for producing longitudinal magnetic lines of force which increase in flux density on the average from said first location to said second location.

9. High power velocity modulation apparatus, comprising means including a cathode and electrostatic focussing means for producing and directing an electron beam along a predetermined axis, first electron permeable resonator means along said axis and having a first gap therein for interaction with said electron beam, said first gap being spaced a predetermined distance from said cathode, second electron permeable resonator means along said axis and having a second gap therein for further interaction with said electron beam, said second gap being further from said cathode than said first gap, third electron permeable resonator means along said axis and having a third gap therein for interaction with said electron beam, said third gap being further from said cathode than said second gap, first drift tube means coaxial with said axis and extending between said first and second gaps, second drift tube means coaxial with said axis and extending between said second and third gaps, a first group of solenoids surrounding said first drift tube means between said first and second resonator means, said first group of solenoids being adjustable for providing longitudinal lines of magnetic force of varying flux density in said first drift tube means for interaction with said beam, a second group of solenoids surrounding said second drift tube means between said second and third resonator means, said second group of solenoids being adjustable for providing longitudinal lines of magnetic force of varying flux density for interaction with said beam in said second drift tube means, further solenoid means and magnetically permeable means adjacent said first resonator means for providing curved lines of magnetic force for interaction with said beam at a predetermined location along said axis from said cathode, means cooperating with said permeable means for shielding said cathode from the magnetic flux produced by said solenoid means, and means reducing the effective diameter of a portion of said second drift tube means in the vicinity of said second resonator gap to dissipate anti-bunch portions of said electron beam in said second drift tube means at said reduced diameter portion thereof.

References Cited in the file of this patent

UNITED STATES PATENTS

| | | |
|---|---|---|
| 2,235,527 | McArthur | Mar. 18, 1941 |
| 2,293,152 | Litton | Aug. 18, 1942 |
| 2,300,052 | Lindenblad | Oct. 27, 1942 |
| 2,367,295 | Llewellyn | Jan. 6, 1945 |
| 2,409,608 | Anderson | Oct. 22, 1946 |
| 2,541,843 | Tiley | Feb. 13, 1951 |
| 2,602,148 | Pierce | July 1, 1952 |